Jan. 10, 1967  R. PAWLUS  3,296,639
COUPLING ARRANGEMENT FOR PLATFORMS, ESPECIALLY OF
AMPHIBIOUS BRIDGING AND FERRYING VEHICLES
Filed Dec. 9, 1964  4 Sheets-Sheet 4

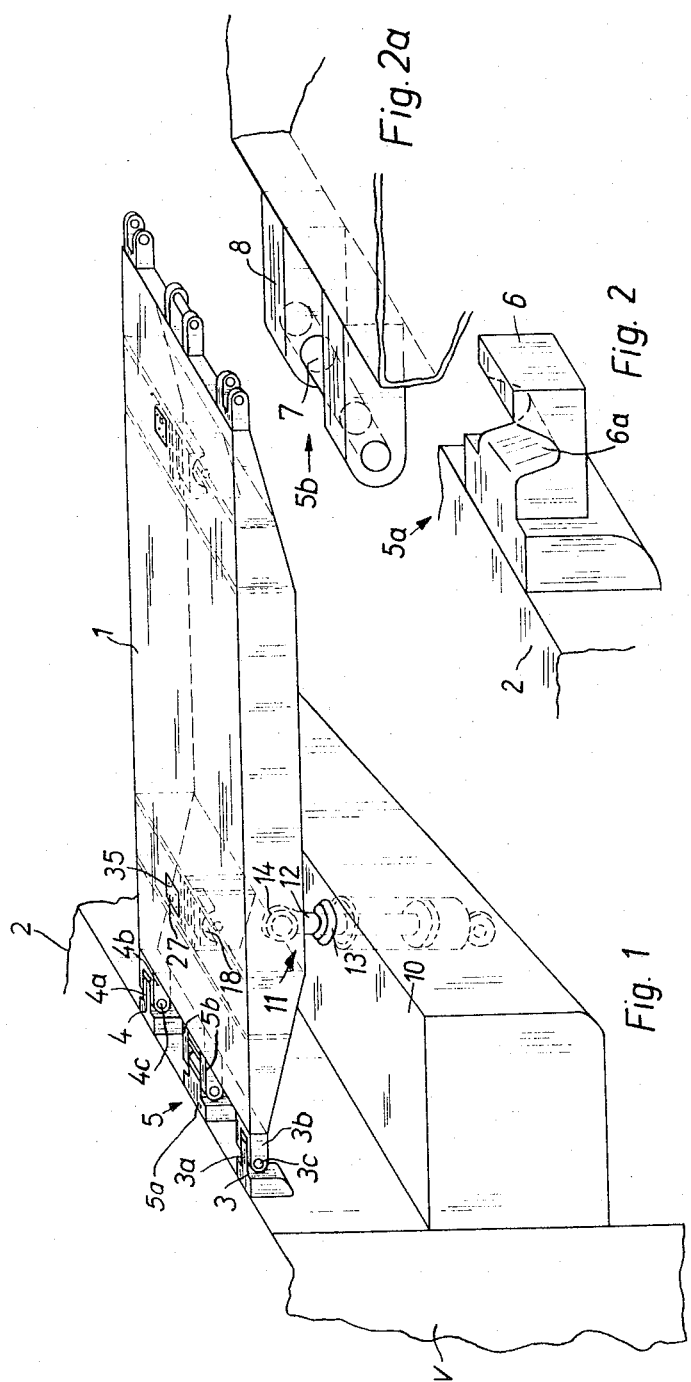

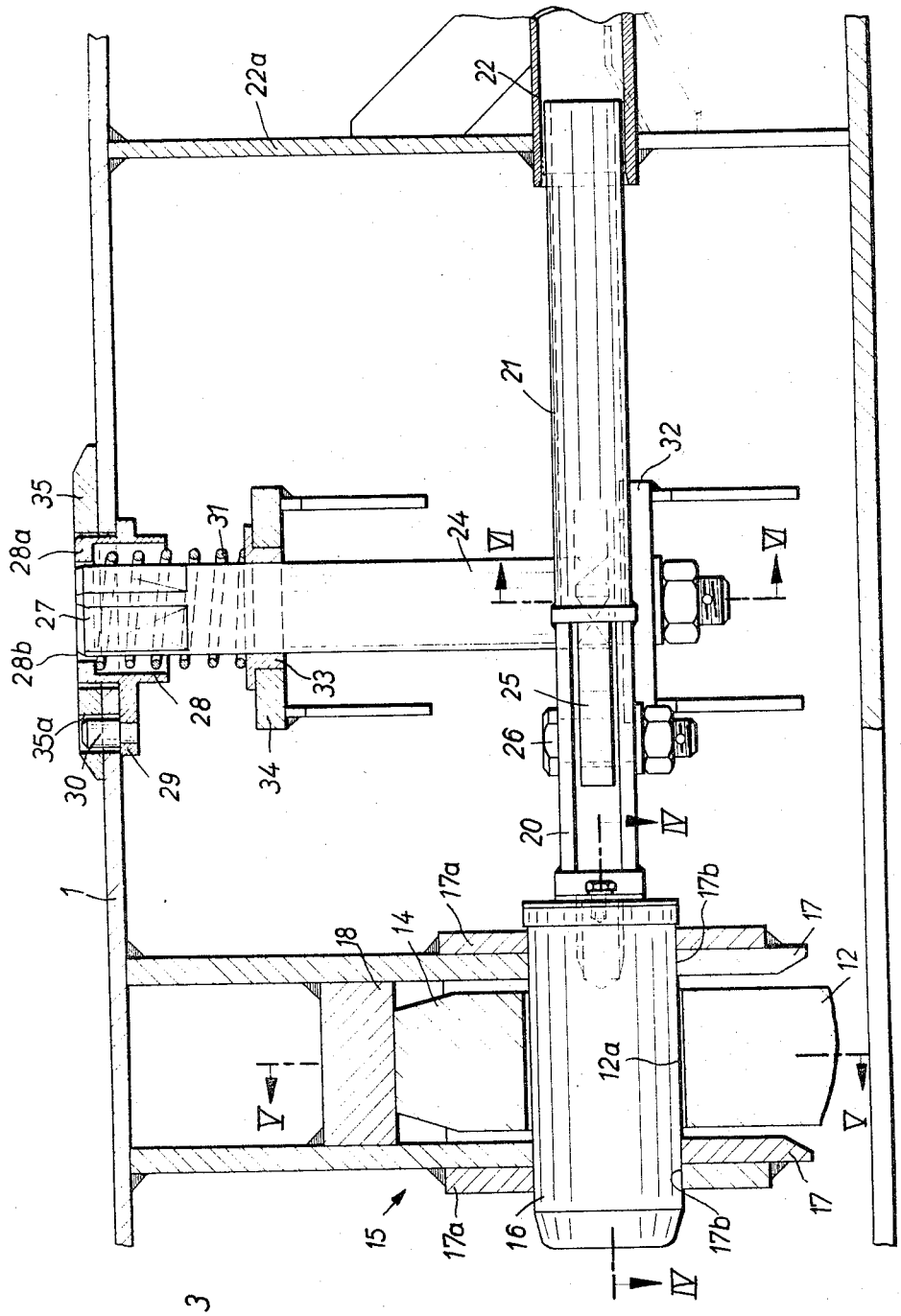

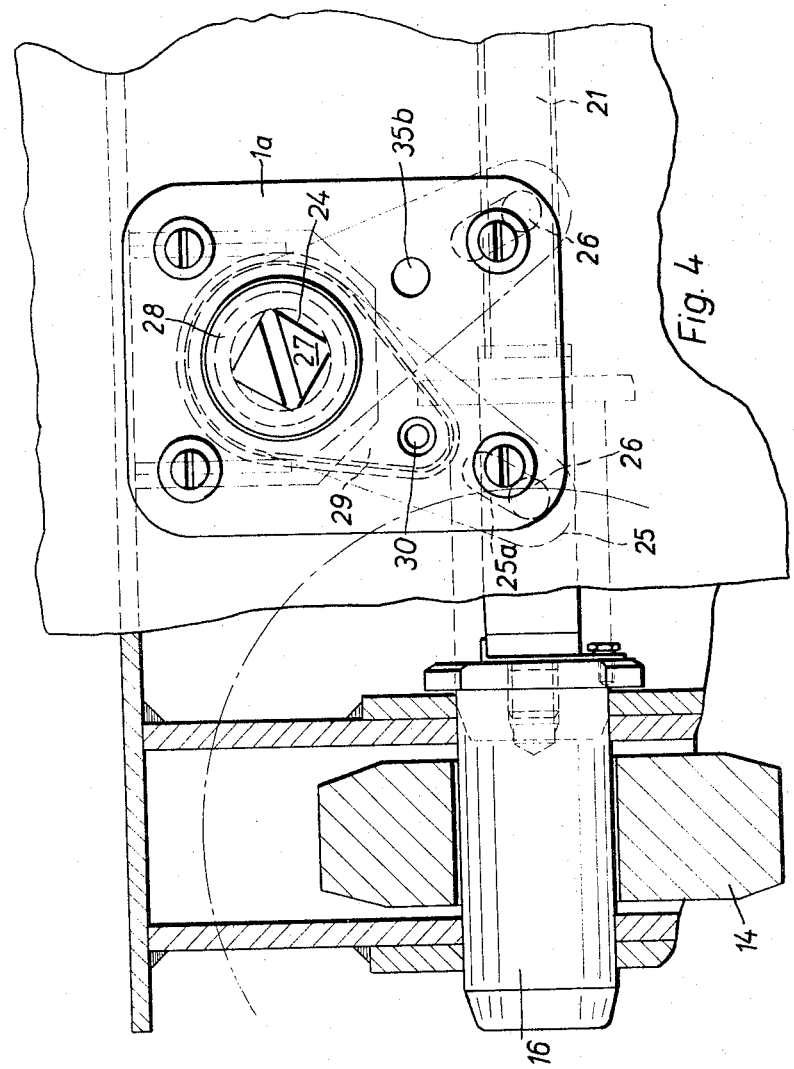

Inventor:
Rudolf Pawlus
By

United States Patent Office 3,296,639
Patented Jan. 10, 1967

3,296,639
COUPLING ARRANGEMENT FOR PLATFORMS, ESPECIALLY OF AMPHIBIOUS BRIDGING AND FERRYING VEHICLES
Rudolf Pawlus, Mainz, Germany, assignor to Klockner-Humboldt-Deutz Aktiengesellschaft, Cologne, Germany
Filed Dec. 9, 1964, Ser. No. 416,992
Claims priority, application Germany, Dec. 10, 1963, K 51,577
2 Claims. (Cl. 14—27)

The present invention relates to an arrangement for coupling platforms, especially for amphibious bridging and/or ferrying vehicles. The invention is particularly directed to an amphibious vehicle having a platform adapted to be hingedly connected thereto and also having hoisting means for connection with the platform so as to hoist the same into proper position for connection with the platform of an adjacent vehicle or into proper position for connection with a river bank or the like. When the amphibious vehicle drives over solid ground, on highways, or the like, the platform is preferably disengaged from the vehicle and is merely carried by the latter. When the vehicle is in the water as support for a bridge, the platform is hingedly connected to the vehicle, and coupling means are provided for connecting this platform to the platform of the next vehicle. When platforms of greater weight are involved, said vehicles are each provided with a light crane for lifting the platform into position for hinge-connection with the respective vehicle. Nevertheless, the continuous movement of the water and thereby of the vehicles in the water makes it rather difficult manually to couple the heavy platforms together in a short period of time.

Another drawback of heretofore known devices of the type involved consists in that the coupling elements are by necessity located below the top surface of the platform and, therefore, are rather difficult to get at.

It is, therefore, an object of the present invention to provide an arrangement for coupling platforms of amphibious vehicles together, which will overcome the above-mentioned drawbacks.

It is another object of this invention to provide an arrangement for coupling platforms of amphibious vehicles together in the water, which will make it possible to effect such coupling manually and quickly.

It is also an object of this invention to provide an arrangement of the type mentioned above, which will permit a manual quick coupling between the platform and a hoisting device pertaining to one and the same vehicle for bringing the platform quickly into the desired position.

It is a still further object of this inventtion to provide an arrangement as set forth in the preceding paragraph, in which the coupling operation between the hoisting device and the platform pertaining to one and the same vehicle can be easily effected from the top of the platform and can easily be checked.

These and other objects and advantages of the invention will appear more clearly from the following specification in connection with the accompanying drawings, in which:

FIG. 1 is an isometric view showing the rear portion of a floating body of an amphibious vehicle with a platform hinged thereto and coupled to a hoisting device of the vehicle.

FIG. 2 shows a supporting member connected to the vehicle.

FIG. 2a illustrates a member connected to the platform for insertion into the hook-shaped member of FIG. 2.

FIG. 3 is a vertical section transverse to the platform and illustrates the coupling arrangement for coupling the hoisting device to the platform, FIG. 3 also showing the actuating means for the said coupling device.

FIG. 4 is a plan view of a portion of FIG. 1, with parts broken away and partly in section along the line IV—IV of FIG. 3.

Figure 6:
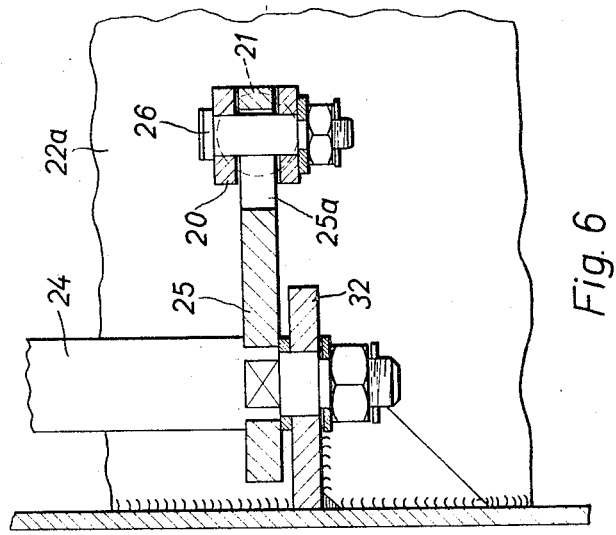
FIGS. 5 and 6 are sections respectively taken along the lines V—V and VI—VI of FIG. 3.
Figure 5:
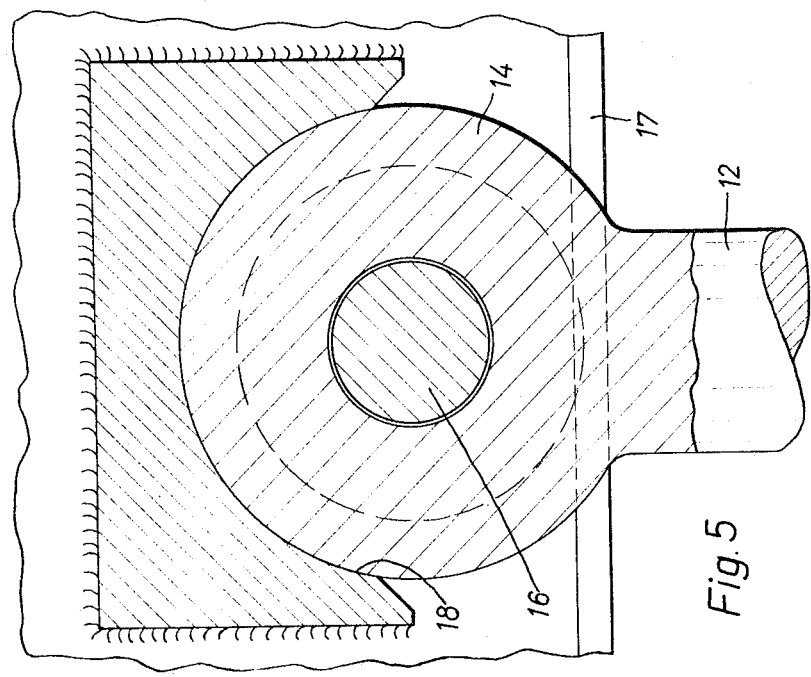

The problem underlying the present invention with regard to an easy and fast coupling of the hoisting device to the platform has been solved according to the invention primarily in that between the hoisting device and the platform there is displaceably mounted in the platform a coupling bolt which is operatively connected to a lever operable from the top of the platform and which is adapted selectively to be moved into and out of a bore in a reciprocable member of the hoisting device. In order to pre-align the hoisting device and the platform with each other, the platform has within the range of engagement of the hoisting device with the platform a downwardly opening channel member the channel of which is intended to receive the top of the reciprocable member of the hoisting device.

The pivotal connection between the vehicle and the platform is in conformity with the present invention on one hand effected by hinge members and on the other hand by link means, for instance a hook-shaped member on the vehicle and bolt carrying arms on the platform so that said bolt is received by said hook. This arrangement greatly facilitates the aligning of the platform with the vehicle inasmuch as the crane hoisting the platform merely has to lower the platform with the bolt carried by protruding arms into the hook or channel of the hook-shaped member on the vehicle which member is preferably arranged between the hinges.

Referring now to the drawings in detail, FIG. 1 shows the rear portion of an amphibious vehicle V which is provided with a floating body 2 having two hinge connections 3 and 4 and a joint 5. Each of the hinge connections 3, 4 consists primarily of a tongue 3a, 4a connected to floating body 2, a fork-shaped member 3b, 4b connected to the platform 1 and a transverse bolt 3c, 4c, said bolts being adapted manually to be inserted through the respective fork-shaped member and the tongue straddled thereby.

The joint 5 differs from the hinge connections 3 and 4 in that the member connected to floating body 2 has the form of a hook 6 (see FIG. 2) with a channel 6a, while the fork-shaped member 8 connected to the platform has a bolt 7 fixedly connected thereto.

The vehicle V is furthermore provided with an additional floating body 10 which is fixedly connected to the main floating body 2 of the vehicle V. However, this additional floating body may also be hingedly connected to main floating body 2 and normally be carried on top of vehicle V during travel on land. The said floating body 10 carries a hoisting device 11, preferably a double acting hydraulic cylinder piston system, with a substantially vertically extending axis. The cylinder is primarily located within a recess of floating body 10 permitting lateral movement for device 11, and has its lower end supported by a pivot joint in any standard manner. Piston rod 12 extends through the top of floating body 10, and at this area is sealed by an elastic bellows 13. The upper end of piston rod 12 forms an eye 14 for engagement with a corresponding channel surface 18 of a bearing 15 so that vertical forces can be absorbed by a link bolt regardless whether they act in downward or upward direction.

In view of the fact that the bottom side of the platform is difficult to get at, it is rather difficult to insert a connecting bolt through the piston rod 12 and a corresponding part of the platform. In order to obviate these difficulties, according to the present invention, the bearing 15 has the lower end of its side walls reinforced by plates 17a welded thereto, and the side walls 17, 17a are provided with a bore 17b which is substantially in axial alignment with bore 12a of piston rod 12 through which the coupling bolt 16 is to be passed. Connected to coupling bolt 16 is a fork-shaped intermediate member 20 which in its turn is connected to a tube 21 arranged in axial alignment with coupling bolt 16. The free end of tube 21 is slidably guided in a bushing 22 which is carried by platform 1 and, more specifically, by transverse arms 22a welded to platform 1.

The arrangement furthermore comprises a shaft 24 the lower end of which is rotatably journalled in and supported by bearing means 32 supported by platform 1, while the upper portion of shaft 24 is journalled in a bushing 33 mounted in a supporting member 34 connected to platform 1. The upper end of shaft 24 has a square head 27 so as to be able to receive a socket wrench for rotating shaft 24. Square head 27 has its uppermost end surrounded by a flange 28a of a bushing 28 which has connected thereto an arm 29. Mounted in arm 29 is an indexing pin 30 which normally engages a bore 35a of a plate 35 connected in any suitable manner to platform 1. Flange 28a of bushing 28 has a square-shaped bore 28b which slidably engages square head 27 for the purpose which will presently appear. Mounted on the top of bushing 33 is one end of a spring 31 the other end of which engages the bottom portion of flange 28a. It will thus be appreciated that when it is desired to have a socket wrench engage square head 27, the socket wrench will be placed on flange 28a and press bushing 28 downwardly until the latter engages the top of bushing 33. In this position, flange 28a still engages the bottom portion of square head 27 while indexing pin 30 has disengaged bore 35a so that shaft 24 can be turned.

Shaft 24 which is laterally offset with regard to the central axes of coupling bolt 16 and tube 21, has its lower end provided with a lever 25 keyed or otherwise connected to shaft 24. Lever 25 extends between the top and bottom members of the fork-shaped intermediate member 20 and is coupled thereto by a bolt 26 as is particularly clearly seen from FIGS 3 and 6. Lever 25 is provided with an oblong opening 25a so as to accommodate pin 26 when lever 25 tilts from one extreme position (left-hand position of FIG. 4) into the other extreme position (right-hand position of FIG. 4) and vice versa. The left-hand position of lever 25 as shown in FIG. 4 corresponds to the position in which coupling bolt 16 is in its fully effective coupling position shown in FIGS. 3 and 4. In this position indexing pin 30 engages bore 35a of plate 35. The right-hand position of lever 25 as shown in FIG. 4 corresponds to the position in which coupling bolt 16 is fully withdrawn from bore 12a of coupling member 12 (FIG. 3). In this position indexing pin 30 engages bore 35b (FIG. 4). Thus, a glance from the top of platform 1 upon plate 35 indicates immediately whether coupling bolt 16 occupies its coupling or uncoupling position.

Operation

It may be assumed that platform 1 is in the vehicle V and that vehicle V is floating in a river, for instance by means of floating bodies 2 and 10. It may also be assumed that indexing pin 30 engages bore 35b (FIG. 4). If it is now intended to mount platform 1 for building a bridge, platform 1 is first withdrawn from the vehicle and lowered by means of bolt 7 onto hook member 6. In this way platform 1 is centered with regard to hinge connections 3 and 4 whereupon the bolts pertaining to the hinge connections 3 and 4 are passed through the respective tongues 3a, 4a and fork-shaped members 3b, 4b. Platform 1 is furthermore lowered onto hoisting device 11 so that channel 18 engages the top of connecting rod 12 and rests thereon. This automatically brings bores 17b into substantially axial alignment with bore 12a in connecting rod 12. The operator now places a box wrench upon flange 28a and presses the box wrench upon the same downwardly so that the box wrench engages square head 27 while bushing 28 is being pressed downwardly against the bearing 33 and against the thrust of spring 31. In this position indexing pin 30 is fully withdrawn from bore 35b. The operator then by means of the said wrench turns shaft 24 clockwise with regard to FIG. 4 so as to move lever 25 from its right-hand position of FIG. 4 to its left-hand position. As a result thereof, coupling bolt 16 moves from its dot-dash position in FIG. 4 to its full line position of FIG. 4 in which it extends fully through bore 12a of connecting rod 12 and occupies its complete coupling position in which the hoisting device 11 is coupled to the platform 1. In this position the indexing pin 30 is in axial alignment with bore 35a. The operator now withdraws the wrench, whereupon spring 31 moves bushing 28 into FIG. 3 position thus causing indexing pin 30 to engage bore 35a. The coupling between hoisting device 11 and platform 1 is now secured, and hoisting device 11 may now be actuated so as to lift platform 1 into any desired position, for instance for hook-up with the next platform of the next vehicle or for connection with a river bank.

It is, of course to be understood that the present invention is, by no means, limited to the particular arrangement shown in the drawings but also comprises any modifications within the scope of the appended claims.

What I claim is:

1. In combination with a body adapted to float, especially an amphibious vehicle: a platform hingedly connected to said body, hoisting means arranged on said body below the top surface of said platform, said hoisting means having a reciprocable member adapted to engage said platform from below, said reciprocable member forming first coupling means and being provided with a first coupling bore therethrough, second coupling means provided with a second coupling bore adapted to be moved into substantially axial alignment with said first coupling bore, coupling bolt means reciprocably supported by said platform and in substantially axial alignment with said second coupling bore, rotatable shaft means rotatably journalled in said platform and extending downwardly therefrom, said shaft means having a polygonal head, sleeve means surrounding said polygonal head and slidably engaging the same so as to be rotatable with said shaft means, arm means connected to said sleeve means and provided with indexing means, said platform being provided with recesses within the range of said indexing means for engagement thereby in two definite positions of said arm means, spring means continuously urging said sleeve means upwardly to thereby urge said indexing means into engagement with the recess means in alignment therewith, said spring means yieldably supporting said sleeve means to thereby permit withdrawal of said indexing means from said recess means in response to the pressure exerted by a pressure socket pressed onto said polygonal head, and means operatively connected to said shaft means and operable in response to the movement of said indexing means from one of said two definite positions to the other one of said two definite positions and vice versa to move said coupling bolt means through said second coupling bore into said first coupling bore and out of said first coupling bore to thereby respectively establish and interrupt coupling engagement between said hoisting means and said platform.

2. An arrangement according to claim 1, in which said reciprocable member is provided with a substantially cylindrical head surface, and which includes a channel member mounted on said platform below the top surface thereof, said channel member having a channel opening downwardly and being of a contour corresponding to the contour of said cylindrical head surface for engagement therewith.

References Cited by the Examiner

UNITED STATES PATENTS

| | | | |
|---|---|---|---|
| 2,579,605 | 12/1951 | Odot | 14—27 |
| 2,750,609 | 6/1956 | Jasef | 14—71 |
| 3,010,128 | 11/1961 | Gillois | 14—1 |
| 3,160,900 | 12/1964 | Sedlacek | 14—27 |
| 3,208,086 | 9/1965 | Gillois | 14—27 |

JACOB L. NACKENOFF, *Primary Examiner.*